US011584441B1

(12) United States Patent
Butukuri et al.

(10) Patent No.: US 11,584,441 B1
(45) Date of Patent: Feb. 21, 2023

(54) VEHICLE WET DRY BARRIER SUPPORT STRUCTURES AND TECHNIQUES

(71) Applicant: Zoox, Inc., Foster City, CA (US)

(72) Inventors: Ramanjaneya Reddy Butukuri, Union City, CA (US); Markus Jost, San Mateo, CA (US); Nirmal Muralidharan, San Mateo, CA (US); Andrew Frank Raczkowski, San Jose, CA (US); Paolo Ruscitti, San Francisco, CA (US); Samantha Schoell, San Francisco, CA (US); Thomas Andrew Stoddart, Mountain View, CA (US); Ashley Williams, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 214 days.

(21) Appl. No.: 17/119,954

(22) Filed: Dec. 11, 2020

(51) Int. Cl.
*B62D 21/15* (2006.01)
*B62D 21/03* (2006.01)
*B62D 21/11* (2006.01)

(52) U.S. Cl.
CPC .......... *B62D 21/152* (2013.01); *B62D 21/03* (2013.01); *B62D 21/11* (2013.01)

(58) Field of Classification Search
CPC ....... B62D 21/152; B62D 21/03; B62D 21/11
See application file for complete search history.

(56) References Cited

U.S. PATENT DOCUMENTS

| 5,482,322 A * | 1/1996 | Wheatley | B60G 3/20 |
| | | | 180/311 |
| 10,189,428 B1 * | 1/2019 | Sellars | B60R 19/34 |
| 2019/0111812 A1 * | 4/2019 | Stover | A01D 67/04 |
| 2019/0217894 A1 * | 7/2019 | Upah | B62D 3/126 |
| 2019/0225041 A1 * | 7/2019 | Upah | B60K 17/16 |
| 2019/0299737 A1 * | 10/2019 | Sellars | B60G 3/225 |
| 2020/0101879 A1 * | 4/2020 | Sakai | B60N 2/015 |
| 2020/0282788 A1 * | 9/2020 | Wolf-Monheim | B60G 13/003 |

FOREIGN PATENT DOCUMENTS

| DE | 102006014552 A1 * | 9/2007 | ............. B62D 21/11 |
| WO | WO-2017081234 A1 * | 5/2017 | ............. B29C 44/42 |

* cited by examiner

*Primary Examiner* — Lori L Lyjak
(74) *Attorney, Agent, or Firm* — Lee & Hayes, P.C.

(57) ABSTRACT

A wet dry barrier support system for a vehicle includes a support structure portion with mounting locations for mounting suspension components of a vehicle, mounting locations for coupling to a body of the vehicle, and a barrier portion to provide an environmental barrier to separate a first area of the vehicle from a second area of a vehicle. The support structure portion may provide a stiff mounting interface between the body and the suspension components by transferring loads therebetween and may define a through-cavity configured to pass a vehicle component through the through-cavity. The barrier portion may plastically deform upon receiving an energetic input from an impact of the vehicle and may prevent the wet dry barrier support system from entering a passenger compartment during the impact.

20 Claims, 8 Drawing Sheets

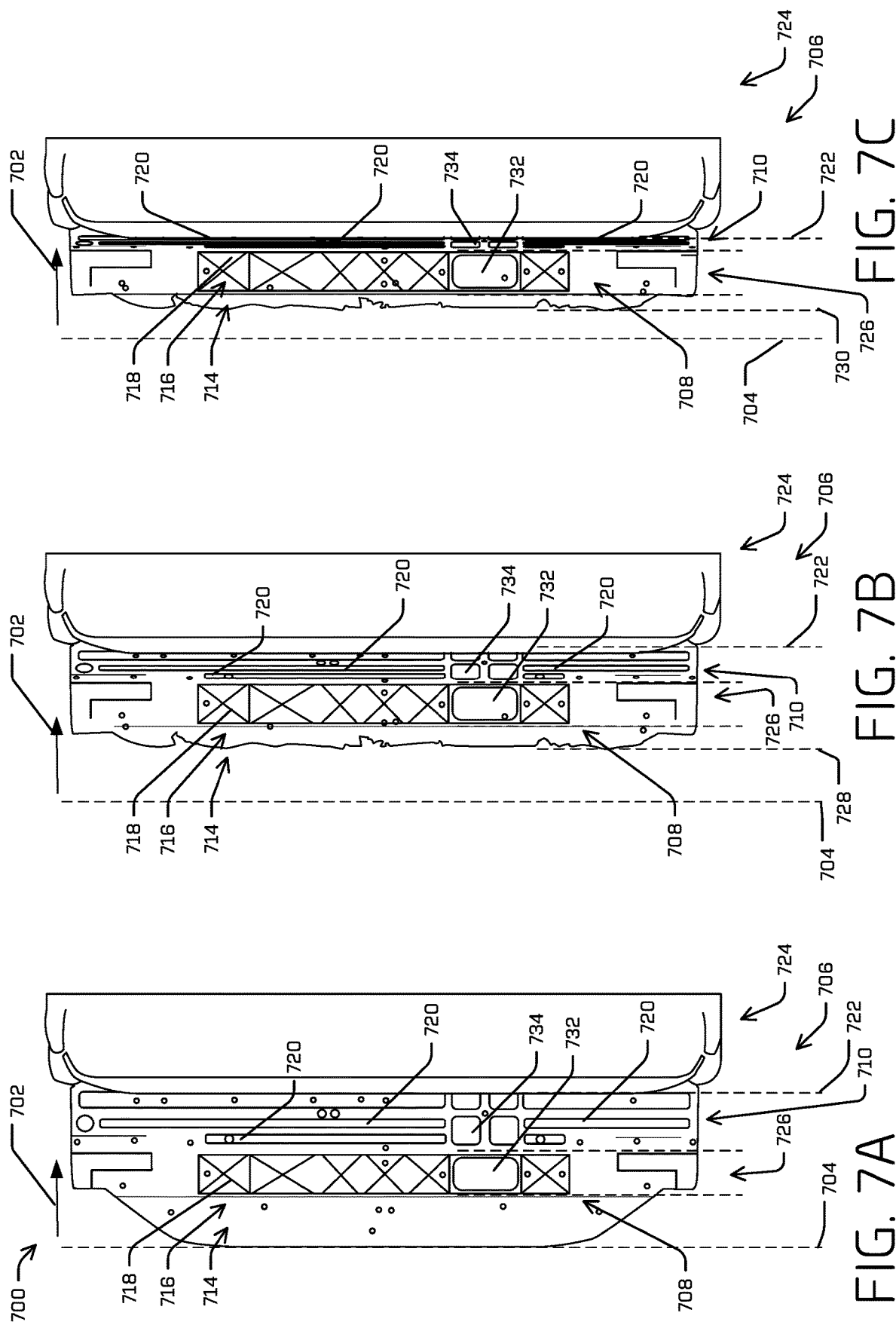

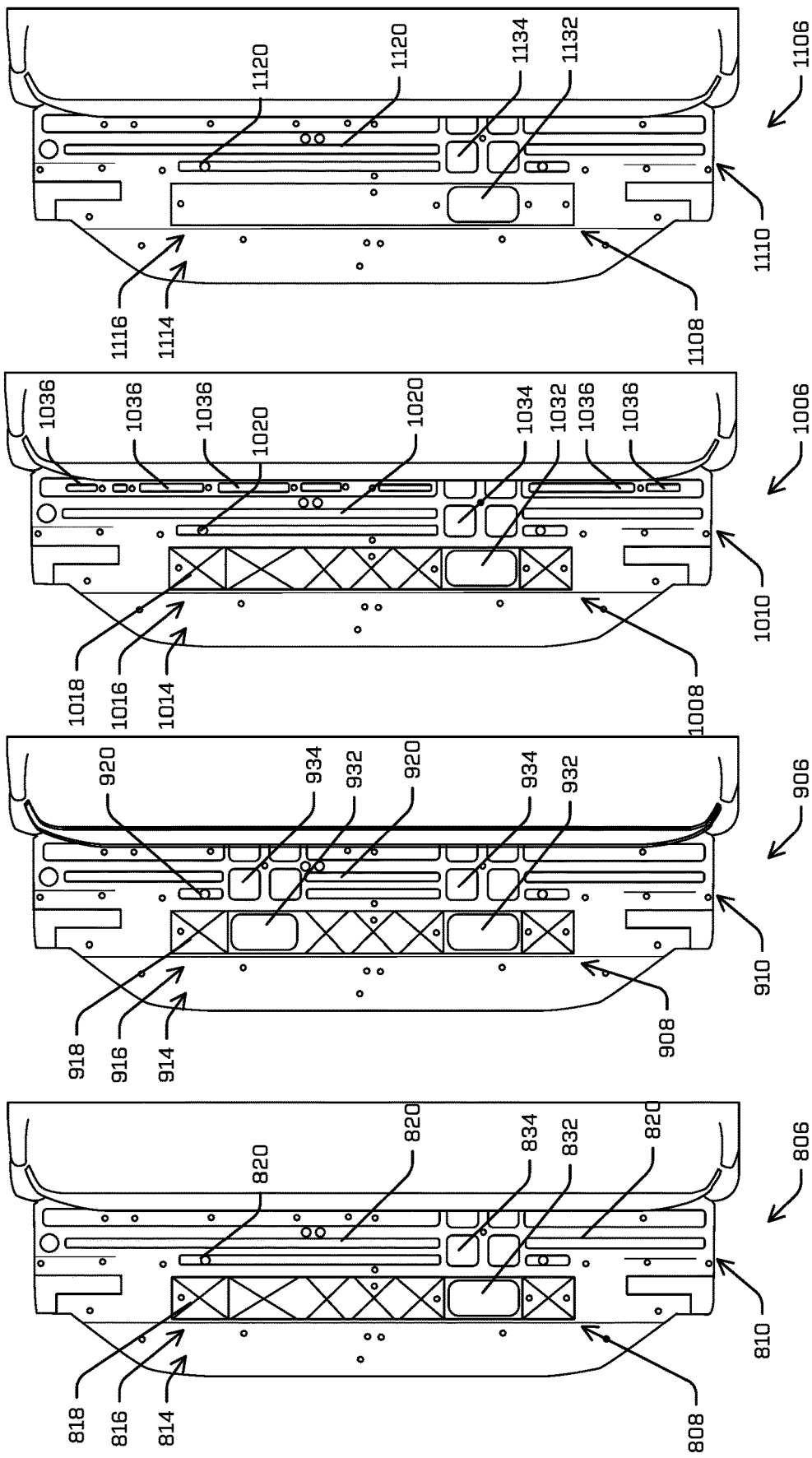

VEHICLE WET DRY BARRIER SUPPORT STRUCTURES AND TECHNIQUES

BACKGROUND

Many vehicles in operation today are designed to operate in varying weather conditions wherein components of the vehicle may become wet. Compact, electric, bidirectional, and/or autonomous vehicles have unique components and configurations that, under certain conditions, may be inadequately protected from liquids and/or moisture to provide protection during operation to components or passengers housed therein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 7A-7C show a simplified schematic illustration of a process and technique to manage energy from an impact through a crash management system.

FIGS. 8A-8D show simplified schematic illustrations of example barrier support systems.

DETAILED DESCRIPTION

Figure 1:
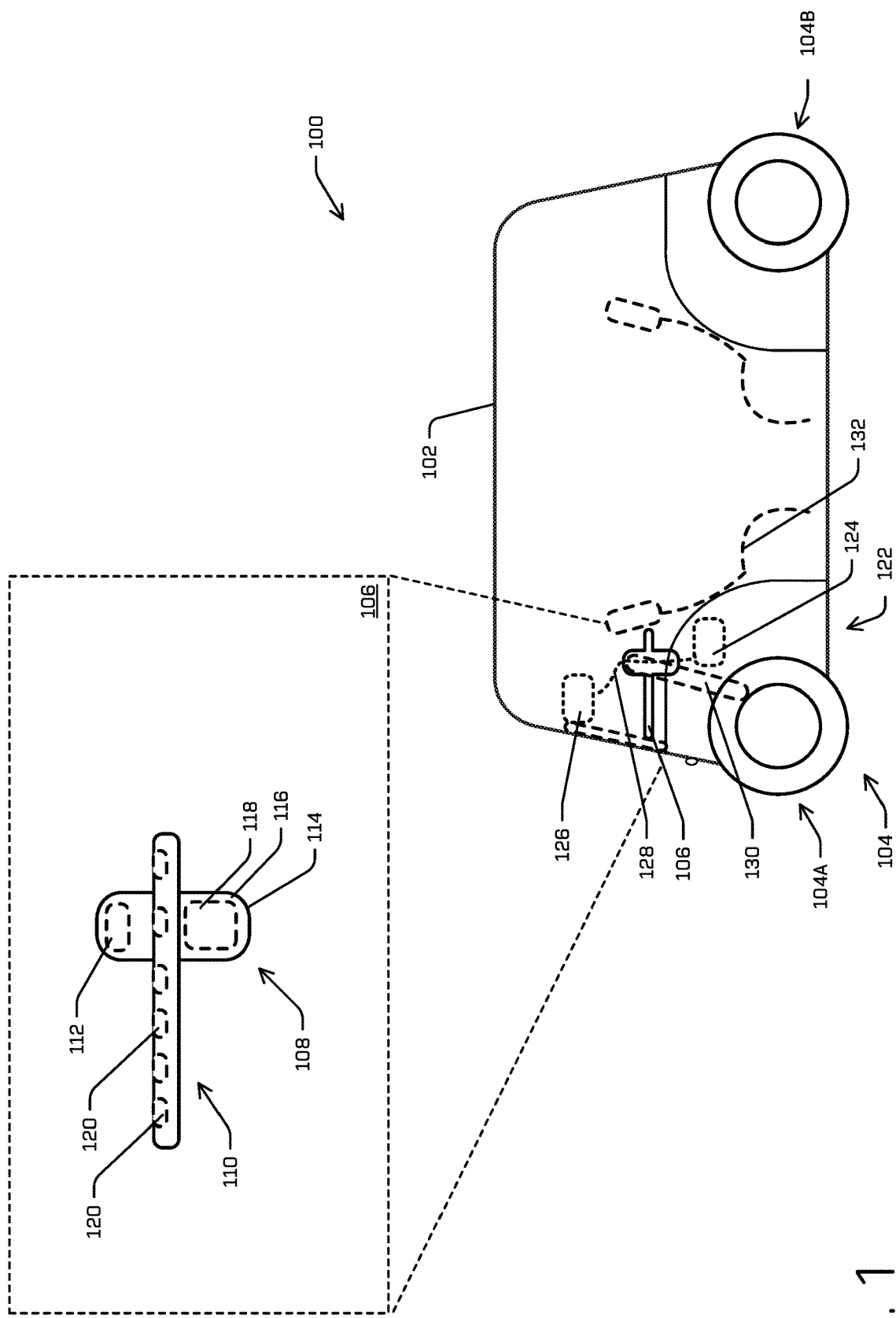
FIG. 1 is an illustration of an example vehicle having a cabin assembly coupled to one or more drive assemblies configured with a barrier support system and structures to protect objects within the autonomous vehicle, in accordance with examples of the disclosure.

Conventional moisture barrier systems may not be adequate to protect certain types of vehicles, and/or may provide insufficient protection for the vehicle passengers during operation of the vehicle in rain or on wet roads. For example, an electric vehicle may include one or more detachable drive modules that, when attached, can enable certain vehicle services and systems to interface with the cabin assembly and passenger compartment. For example, heat, ventilation, and air/conditioning (HVAC) ducts or other components may pass through a vehicle barrier between a drive module and a passenger compartment of the vehicle to allow air to pass therethrough.

This application relates to structures and techniques related to a moisture barrier to keep wet portions of a vehicle separate from dry portions of the vehicle. The moistures barrier can act as an environmental barrier to keep climates separate between different portions of the vehicle. It may be desirable to have a moisture barrier that also provides structural support to the vehicle. This configuration may reduce the overall weight of the vehicle and/or allow other systems or features to be included due to the weight reduction as opposed to separate, stand-alone systems. It may also provide more flexibility in component mounting locations while still providing sufficient rigidity for mounting suspension or other vehicle components. Additionally, in situations where the vehicle may be involved in an impact or collision, the barrier may be configured to absorb energy and/or deform to prevent the barrier from adversely affecting passengers in the passenger compartment. This may be especially advantageous wherein the barrier is located adjacent to a passenger seat.

For example, a support barrier system may include a first mounting location configured to couple to a suspension of a vehicle and a second mounting location configured to couple to the suspension. The vehicle may also include a support structure connecting the first mounting location and second mounting location, the support structure configured to transfer a load between the suspension and a body of the vehicle through the first mounting location and second mounting location, the support structure comprising a through-cavity configured to pass a vehicle system through the through-cavity. In some examples, the vehicle also includes a barrier portion configured to separate a first area of the vehicle from a second area of a vehicle, the barrier portion configured to transfer energy through the barrier portion and absorb energy through the barrier portion in an impact of the vehicle with an external object. In certain examples, the support structure may include an energy transfer structure. In other examples, the energy transfer structure may include a channel with vertical webs spanning between walls of the channel. In certain examples, the energy transfer structure may provide a rigid structure that may transfer energy through the structure, for example, from the vehicle suspension to the body or vice versa, and/or from one suspension portion to another suspension portion. In certain examples, the energy transfer structure may be relatively stiff along its length and may support bending moments, tension and/or compression forces. In certain examples, the energy transfer structure may be tuned to suppress and/or reduce vibrations and/or harmonic loads transferred to the energy transfer structure (e.g., vibrations transferred from the ground through the suspension, vibrations transferred from aerodynamic forces on the body, or combinations thereof.

The vehicle may also include the through-cavity passing through a wall of the channel. In certain examples, the through-cavity may be sized to pass various vehicle systems from one area of the vehicle to another. For example, the HVAC system may pass multiple ducts through the support barrier system from an air handler or air conditioning components located in a first part of the vehicle to an air delivery location, (e.g., a vent) in a second part of the vehicle.

In certain examples, the barrier portion may be configured to deform (e.g., plastically deform, crumple, and/or compact) in the first direction upon receiving an energetic input in the first direction above an energy threshold. In certain examples, the energetic input may be associated with an impact or crash with the vehicle. In certain examples, the energy threshold may be greater than 100 kN. In certain examples, the barrier portion may include a plurality of channels substantially orthogonal to the first direction, a first channel of the plurality of channels spaced sufficiently from a second channel of the plurality of channels to cause surface of the barrier portion between the first channel and second channel to overlap a lower portion of the first channel or second channel when in a deformed configuration.

In some examples, the support structure and/or the barrier portion may use various materials. For example, they may include aluminum, Al alloys, steel, steel alloys, magnesium, magnesium alloys, carbon, carbon fiber, Kevlar, composites or combinations thereof among other materials. In certain examples, the materials may be selected based on material properties including strength, energy absorption characteristics, stress-strain relationships, ultimate strength, strength-density ratio, damage tolerance, toxicity, durability, among others. The materials may also be selected based at least in part on availability, cost, manufacturability, environmental impacts, among others.

In some examples, an aluminum alloy may be selected to provide a balance of a relatively low weight to a relatively high strength and energy absorption characteristics. Additionally or alternatively, the aluminum alloy may also provide a relatively low cost, high availability, and ease of manufacturing.

In some examples, a carbon composite may be used to form a structural component of the support barrier system, while other materials may be used in less structural applications or in structural applications where loads may be less compatible with the composite. For example, the energy transfer structure may include carbon fiber substrates with an epoxy resin that spans the width of the barrier support system providing a low weight structure with a relatively high load handling capability. In certain examples, the composite structure may be joined with an alloy form structure to address different loads. For example, the mounting locations may be subject to higher and/or more focused loads and/or impact loads, that may not be desirable to apply directly to the composite structure. In this example, a metal alloy may be more desirable to use to interface with the suspension system and transfer the energy to the composite structure in a more compatible (e.g., controlled, dampened, tapered, and/or reduced) way.

In some examples, the barrier portion may include composites and joined with the composite based energy transfer structure. In certain examples, the barrier portion may include composites and joined with the metal alloy based energy transfer structure. the barrier portion may include alloys and joined with the composite based energy transfer structure.

In some examples, such as in the case of a bidirectional vehicle, the vehicle may include support barrier systems disposed at both longitudinal ends of the vehicle. In such examples, the vehicle may include a first drive assembly disposed at a first longitudinal end of the vehicle which interfaces with a first support barrier system, and a second drive assembly disposed at a second longitudinal end of the vehicle which interfaces with a second support barrier system.

In some examples, a cabin assembly of a vehicle (e.g., bidirectional or unidirectional vehicle) may include a support barrier systems disposed at a distal end of the cabin assembly and configured provide energy transfer though the vehicle and to absorb energy from an impact with an external object.

In some examples, the bidirectional vehicle may travel in different directions at different times without requiring the passengers to re-orient, move, or relocate within the cabin. Consequently, a passenger may be faced away from the direction of travel at a time when the vehicle receives an impact. In certain examples, where the vehicle has a carriage seating arrangement the passenger may directly behind the support barrier system. In this situation, the energy absorbed by the support barrier system may provide further protection to the passenger. For example, the energy absorption features may prevent the support barrier system itself from impinging upon the passenger or entering the cabin, but the energy abortion features may also slow down and/or stop other components or foreign material from impinging upon the passenger or entering the cabin as well.

FIG. 1 is an illustration of an example vehicle 100 having a cabin assembly 102 coupled to one or more drive assemblies 104 configured with a barrier support system 106 and structures to protect objects within the autonomous vehicle, in accordance with examples of the disclosure. The vehicle shown in FIG. 1 can be a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, the energy management structures described herein may be applicable to non-autonomous and/or non-bidirectional vehicles as well. Also, while examples are given in which the vehicle is a land vehicle, the techniques described herein are also applicable to aerial, marine, and other vehicles.

In the illustrated example, the vehicle 100 includes a body, for example a cabin assembly 102, a first drive assembly 104A, and a second drive assembly 104B (collectively "drive assemblies 104") coupled to a cabin assembly 102. The cabin assembly 102 in this example includes a barrier support system 106 at each interface with a drive assembly, for example, drive assembly 104A and drive assembly 104B. As used herein, a cabin assembly can include a seat assembly, a frame, a body, or other components for housing occupant(s) of a vehicle. In this example, the barrier support system 106 includes a support core 108 and a barrier portion 110. In certain examples, the support core 108 includes a mounting location 112 and a support structure 114. In certain examples, the mounting location 112 may couple to a suspension system of the vehicle and transfer loads from the suspension system and distribute them around the vehicle. In certain examples, the support structure 114 may include an energy transfer structure 116, for example, a channel, a beam, or other structural member, and may include stiffening members 118 disposed through the energy transfer structure 116. In certain examples, stiffening members 118 may include vertical webbing, for example, in a crossing, honeycomb, distributed pattern, among others. In certain examples, the barrier portion 110 may include stiffening features 120 disposed across a surface of the barrier portion 110. In certain examples, the stiffening features 120 may include channels, corrugation, ribs, bosses, gussets, honeycomb, among other features to provide stiffness in some directions and allow deformation in others.

In the illustrated example, each of the drive assemblies 104 includes multiple vehicle systems 122, for example, power, climate control including heating, ventilation, and air conditioning ("HVAC"), fluid, data, among others that may interact with the cabin assembly 102 or the other drive assembly 104. For example, the vehicle system 122 may include a drive assembly module 124 and a cabin assembly module 126 that may be coupled through connection 128. In certain examples, the drive assemblies 104 may include vehicle suspension 130 that interacts with the vehicle drive and propulsion systems and may be configured to distribute and/or transfer energy and loads associated with the vehicle movement.

In certain examples, the cabin assembly 102 may include a cabin configured to transport passengers. For example, cabin assembly 102 may include seating systems 132 configured to allow a passenger to sit and/or recline while in the cabin.

Figure 2:
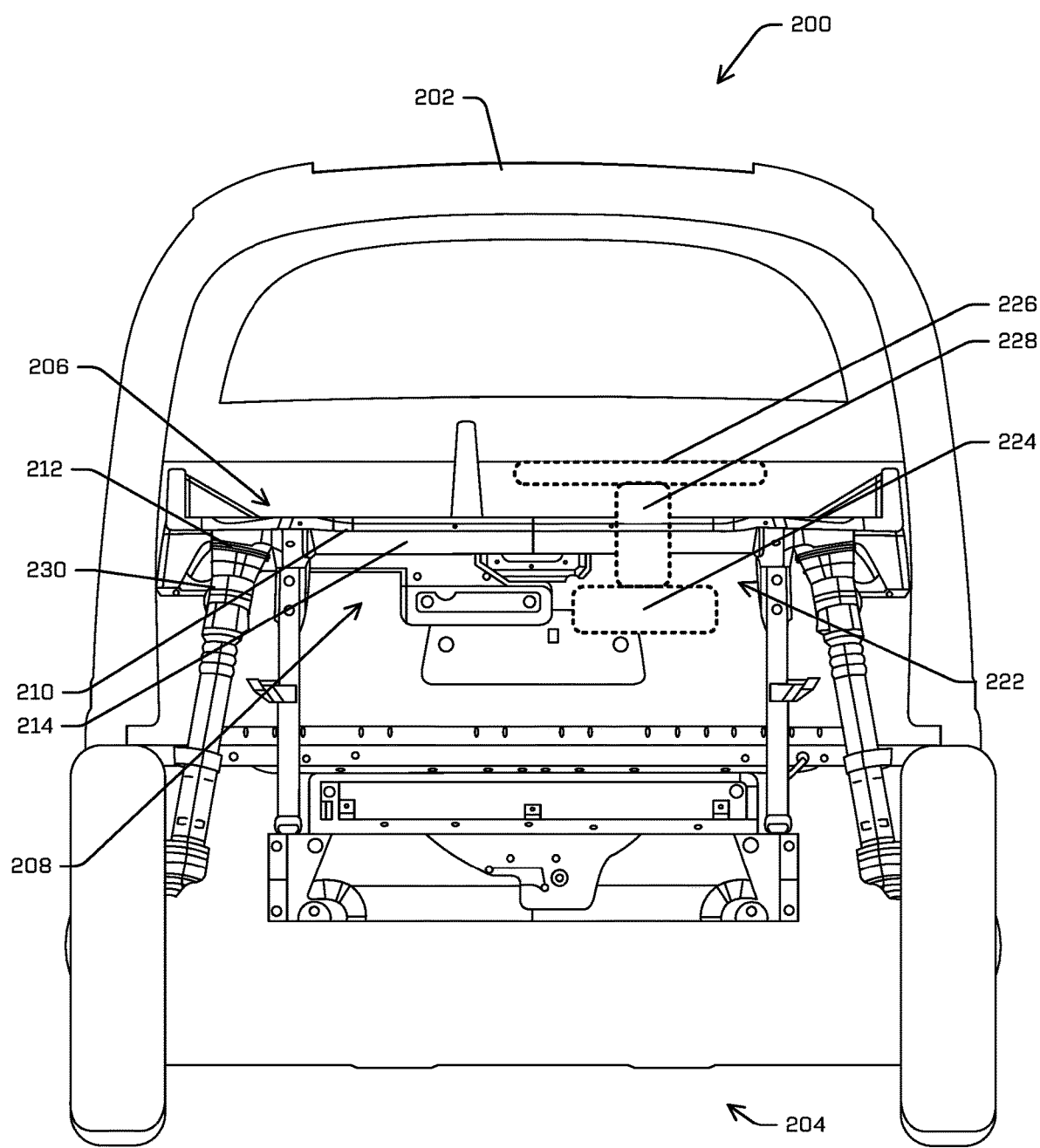
FIG. 2 is a cutaway view of an example vehicle having a cabin assembly coupled to one or more drive assemblies configured with a barrier support system and structures to protect objects within the autonomous vehicle, in accordance with examples of the disclosure.

FIG. 2 is a cutaway view of another illustrative example vehicle 200 having a cabin assembly 202 coupled to one or more drive assemblies 204 configured with a barrier support system 206 and structures to protect objects within the autonomous vehicle. In the illustrated example, the vehicle 100 includes a body, for example a cabin assembly 202, a drive assembly 204 coupled to a cabin assembly 202. The cabin assembly 202 in this example includes a barrier support system 206 at an interface with a drive assembly 204. In this example, the barrier support system 206 includes a support core 208 and a barrier portion 210. In certain examples, the support core 208 includes a mounting location 212 and a support structure 214. In certain examples, the mounting location 212 may couple to a suspension system of the vehicle and transfer loads from the suspension system and distribute them around the vehicle.

In the illustrated example, the drive assembly 204 includes multiple vehicle systems 222. In this example, the vehicle system 222 may include a drive assembly module 224 and a cabin assembly module 226 that may be coupled through connection 228. FIG. 2 shows an example, where the vehicle system 222 includes an HVAC system. In this example, the drive assembly module 224 may include an air handler and the cabin assembly module 226 includes an air distribution system which may include fans, vents, sensors, among other components. In this example, the drive assembly module 224 and a cabin assembly module 226 may be coupled through connection 228 in the form of a duct, hose, tube, conduit or other passage. In this example, the duct of connection 228 may pass through the support structure 214.

Additionally or alternatively, in certain examples, the drive assemblies 204 includes a vehicle suspension 230 that interacts with the vehicle drive and propulsion systems and may be configured to distribute and/or transfer energy and loads associated with the vehicle movement. In this example, the vehicle suspension 230 may receive and transfer loads to the barrier support system 206 through mounting locations 212. In this example, the barrier support system 206 may transfer those loads from the vehicle suspension 230 through the barrier support system 206. In certain examples, it may be advantageous for the barrier support system 206 to be relatively stiff and relatively rigidly attached to the body and or frame of the vehicle. In certain examples, the rigid attachment to the body or frame of the vehicle and stiff configuration of the barrier support system 206 coupled to a compliant vehicle suspension provides improved handling of the vehicle with reduced transmission of noise and vibrations. For example, the NVH (noise, vibration, handling) of the vehicle may be improved by a stiff barrier support system 206 rigidly attached to the body or frame of the vehicle and coupled to the vehicle suspension 230.

In certain examples, it may be advantageous to locate the interface between the vehicle suspension and the body or frame of the vehicle adjacent to the cabin. In these examples, packaging constraints of the vehicle may cause a vehicle system to pass through a location of the vehicle, where a solid structural member would otherwise be located to provide the rigid mounting or coupling to the vehicles suspension. In this example, the barrier support system may provide the desired stiffness and mounting locations of the vehicle suspension to improve NVH while accommodating the path of the vehicle system, for example, an HVAC passthrough. As shown in FIG. 2, the drive assembly 204 includes multiple vehicle systems 222. In the example shown in FIG. 2, the vehicle system 222 includes a drive assembly module 224 and a cabin assembly module 226 coupled through connection 228 where the vehicle system 222 includes an HVAC system. In the example of FIG. 2, the drive assembly module 224 includes an air handler and the cabin assembly module 226 includes an air distribution system where the drive assembly module 224 and a cabin assembly module 226 are coupled through connection 228 in the form of a duct. In this example, the duct of connection 228 passes through the support structure 214 via orifice 232. In this example, orifice 232 creates a through-cavity or pass through support structure 214. In this example, orifice 232 has an opening that is substantially as wide as the support structure 214. In certain examples, support structure 214 may be slightly wider than orifice 232 (shown in FIG. 3). In certain examples, orifice 232 may extend from a first vertical portion of support structure 214 to second vertical portion of support structure 214. In certain examples, where the support structure is slightly wider than the orifice, the energy transfer structure may still be designed to support loads, but also provide an increased and/or maximum area for the vehicle components to pass through the structure.

Figure 3:
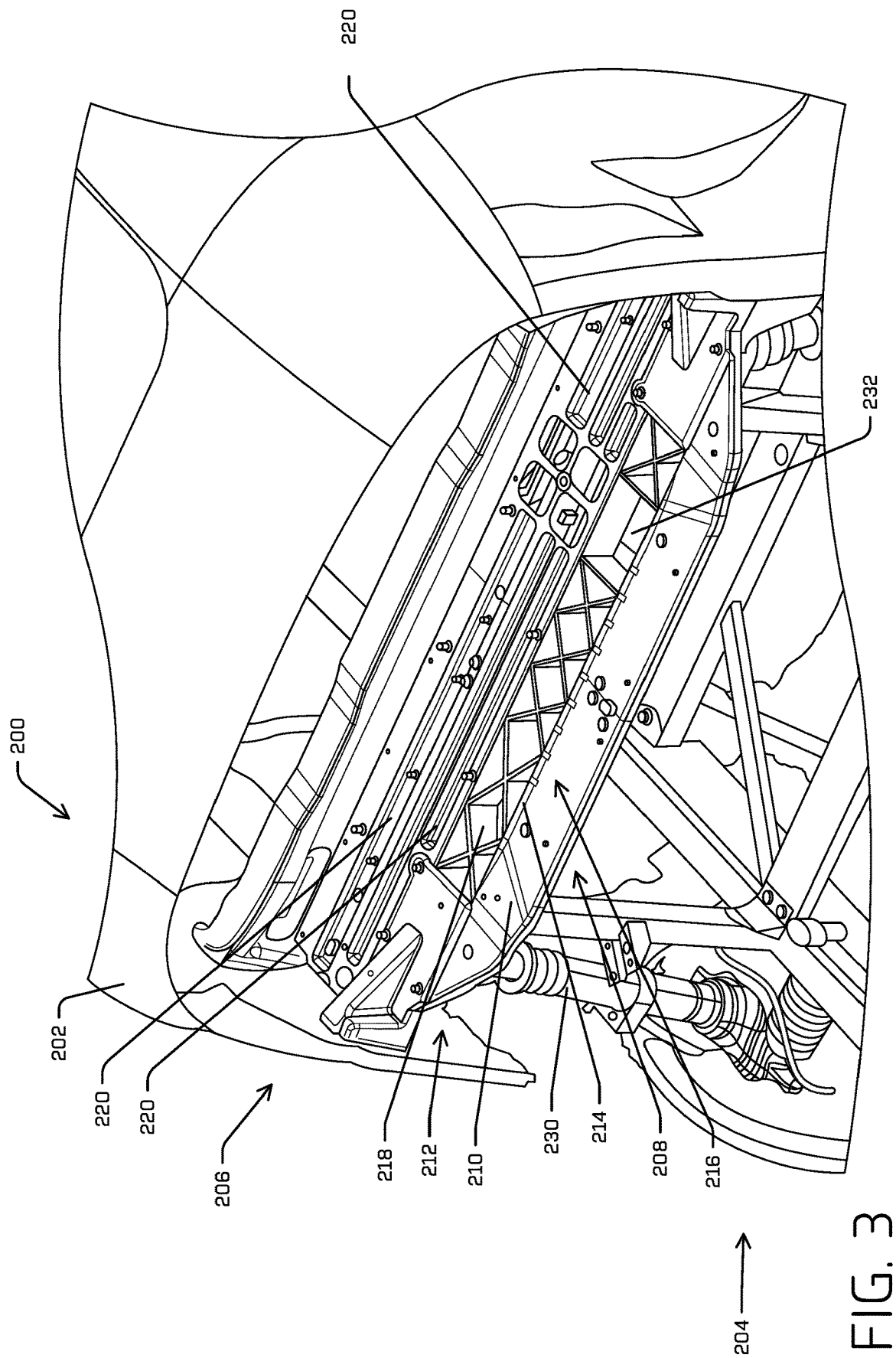
FIG. 3 is a cutaway perspective view of the example vehicle with cabin assembly coupled to the drive assembly configured with the barrier support system in the context of the vehicle of FIG. 2.

FIG. 3 is a cutaway perspective view of illustrative example vehicle 200 with cabin assembly 202 coupled to the drive assembly 204 configured with the barrier support system 206. The cabin assembly 202 includes the barrier support system 206 at the interface with the drive assembly 204. In this example, the barrier support system 206 includes a support core 208 and the barrier portion 210. In this example, the support core 208 includes the mounting location 212 and a support structure 214. Here, the mounting location 212 couples to the suspension 230 of the vehicle 200 and transfers loads from the suspension 230 and distributes them around the vehicle 200.

FIG. 3 also shows the support structure 214 having an energy transfer structure 216, for example, a c-channel, and includes stiffening members 218 disposed through the energy transfer structure 216. In this example, stiffening members 218 include a vertical webbing in a distributed crossing pattern.

FIG. 3 also shows the barrier portion 210 may including stiffening features 220 disposed across a surface of the barrier portion 210. In this example, the stiffening features 220 include a channel configuration to provide stiffness in some directions and allow deformation in others. In certain examples, the stiffening features 220 may allow for deformation multiple directions. For example, the stiffening features 220 may include holes and/or thinned portions of the barrier portion 210. In this example, the holes and/or thinned portions of barrier portion 210 may be configured to allow the barrier portion 210 to deform and/or crumple in a desired way. In examples, where the features are holes, a second material may be used to seal the hole to maintain the moisture barrier. In these examples, the second material may be a material with a lower bending and/or compression strength when compared to a first material that makes up a structural portion of the barrier portion 210.

Figure 4:
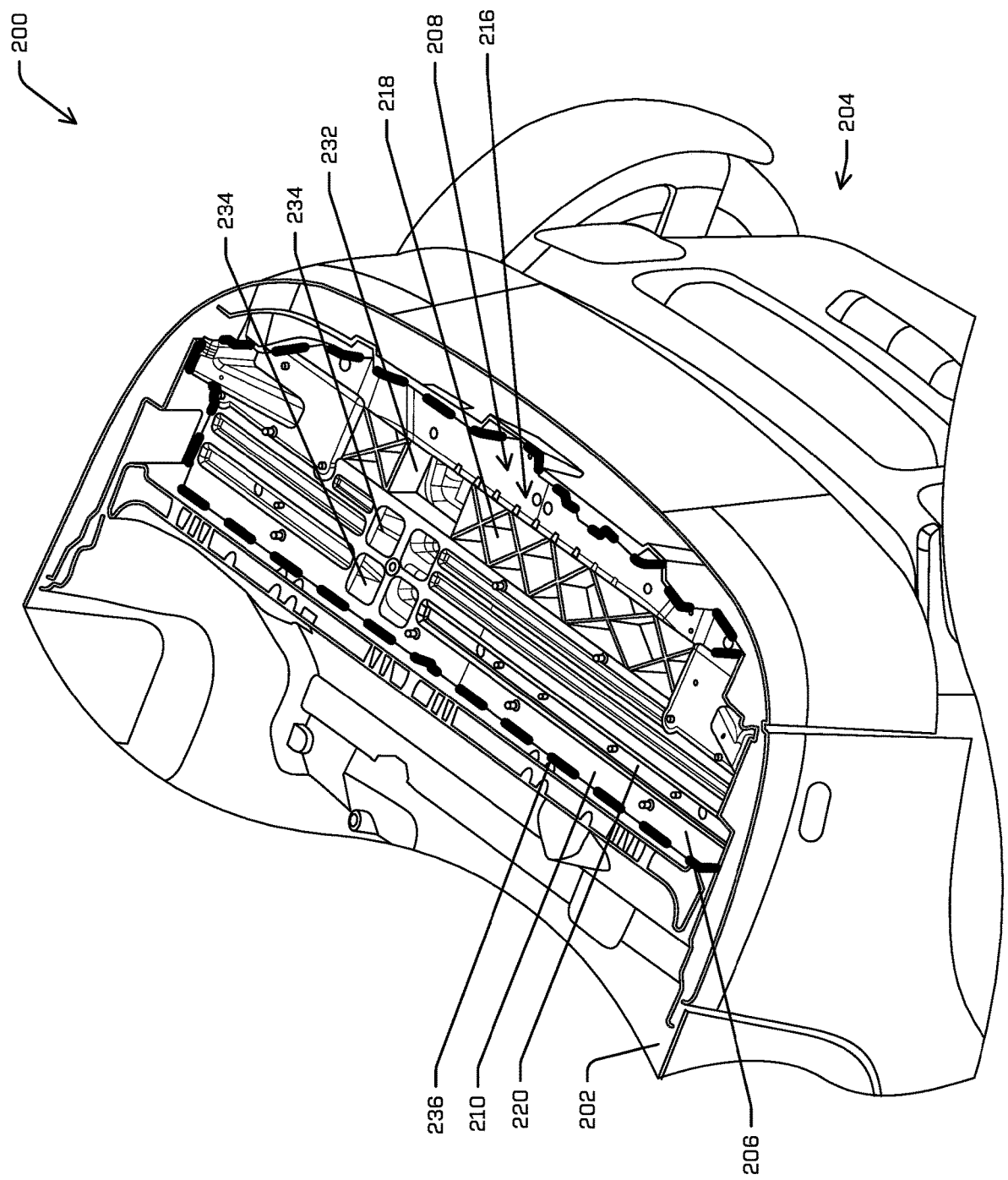
FIG. 4 is a cutaway perspective view of the example vehicle with cabin assembly coupled to the drive assembly configured with the barrier support system in the context of the vehicle of FIG. 2.

FIG. 4 is a cutaway perspective view of illustrative example vehicle 200 with cabin assembly 202 coupled to the drive assembly 204 configured with the barrier support system 206. The cabin assembly 202 includes the barrier support system 206 at the interface with the drive assembly 204. In this example, the barrier support system 206 includes a support core 208 and the barrier portion 210. In this example, the support core 208 includes the support structure 214 having a energy transfer structure 216 with stiffening members 218 dispersed through the energy transfer structure 216.

FIG. 4 also shows the barrier portion 210 including stiffening features 220 disposed across a surface of the barrier portion 210. In this example, the stiffening features 220 include a channel configuration to provide stiffness in some directions and allow deformation in others. FIG. 4 also shows barrier portion 210 including orifice 234. In example, orifice 234 may provide similar capabilities as orifice 232.

FIG. 4 also shows barrier interface 236 illustrating an interface between the cabin assembly 202 and the barrier support system 206. In this example, the barrier interface 236 may comprise a seal, for example, a gasket, an interference fit, an overlap of mating surfaces, an adhesive, mechanical bond or combinations thereof to aid in providing a moisture barrier between a dry environment of the cabin assembly 202 and a wet environment in portions of drive assembly 204. Additionally or alternatively, other penetrations of the barrier support system 206, for example, orifices 232 or 234 may be similarly sealed to aid in the barrier function. In certain examples, the orifices 232 or 234 may include a lip feature that may add local strength and or rigidity to the surfaces surrounding the orifices. In certain examples, the lip feature may include material added around an orifice opening. In certain examples, the lip feature may include material being deformed locally around the orifice, for example, a lip formed by a dimple press.

In certain examples, the moisture barrier may provide a seal between the relatively dry cabin portion of the vehicle and the relatively wet portion of the drive assemblies. While the cabin need not be completely dry and the drive assembly not completely wet, the moisture barrier can serve to isolate the climate controlled cabin from the uncontrolled or lesser controlled or differently controlled space of the drive assembly. In certain examples, the moisture barrier prevents uncontrolled liquids from entering the cabin from the drive assembly. In certain examples, the moisture barrier prevents uncontrolled gasses from entering the cabin from the drive assembly.

In certain examples, the barrier portion may comprise a contiguous surface contained within barrier interface 236 where moisture is not permitted to pass through the contiguous surface. In certain examples, the moisture is not permitted to pass uncontrolled through the contiguous surface. In certain examples, the contiguous surface of the barrier portion may include penetrations, for example, for fasteners, sensors, wires, or combinations thereof. In certain examples, penetrations through contiguous surface of the barrier portion are sealed to prevent moisture from passing, uncontrolled, through the barrier portion.

Example Barrier Support System Structures and Techniques

Figure 5A:
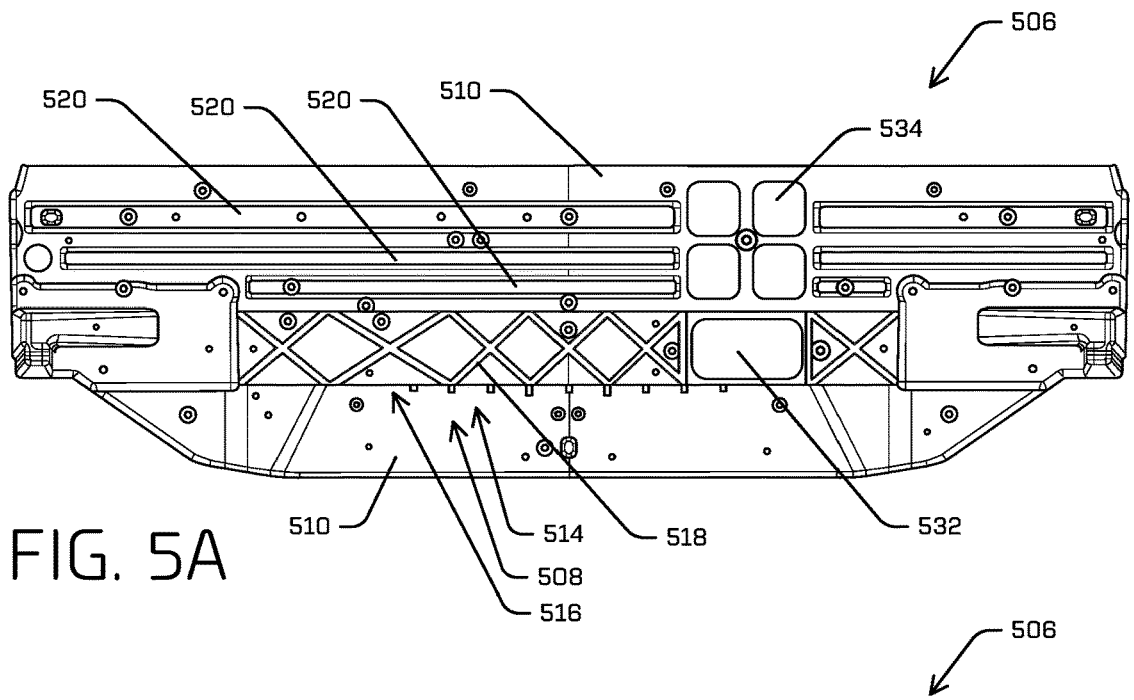
FIGS. 5A-C and FIG. 6 show multiple views of an example barrier support system.
Figure 5B:
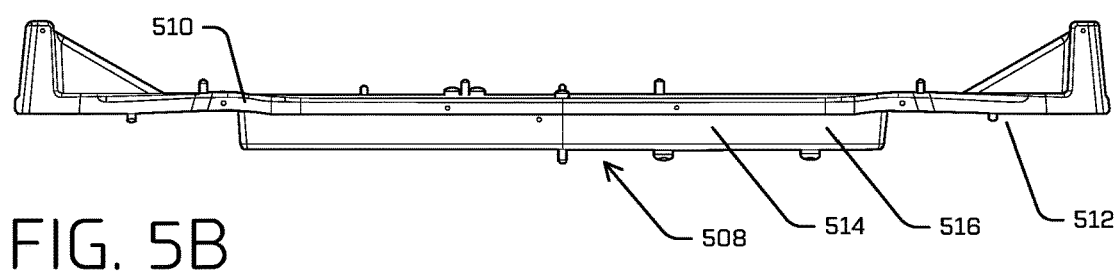
Figure 5C:
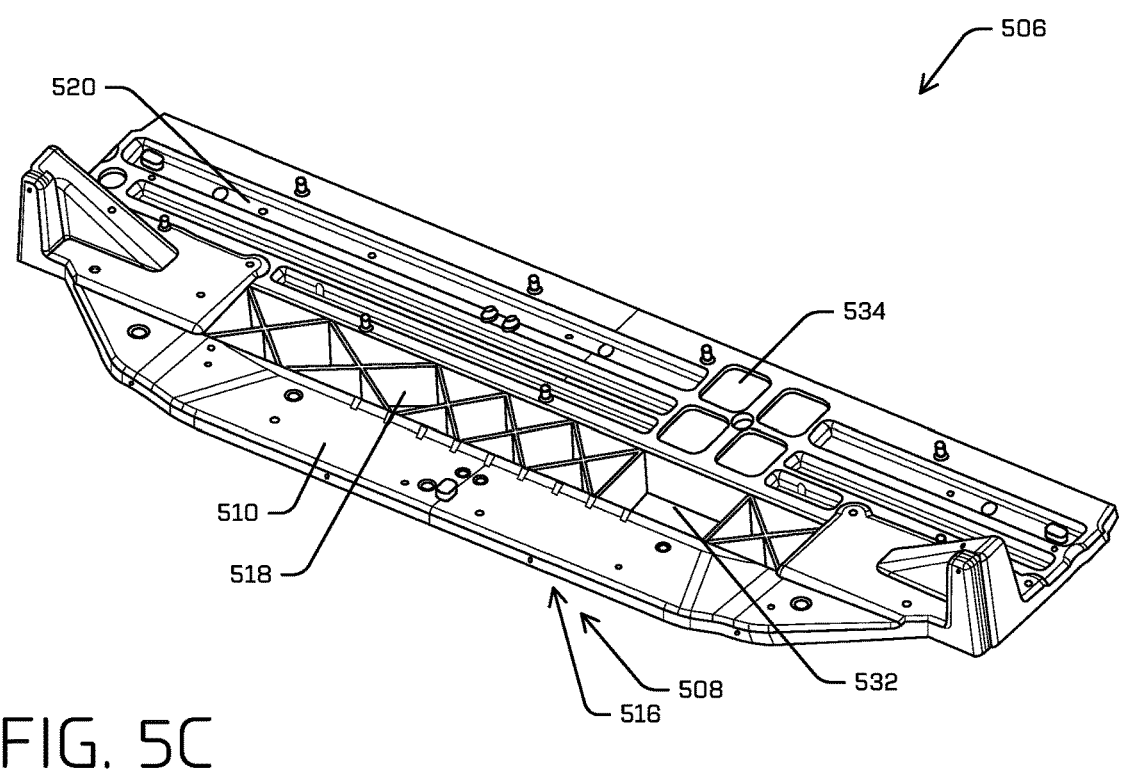

FIGS. 5A-5C show multiple views of an example barrier support system 506. In certain examples, barrier support system 506 is similar to barrier support system 206 as shown in FIGS. 2-4. In this example, the barrier support system 506 includes a support core 508 and a barrier portion 510. In certain examples, the support core 508 includes a mounting location 512 and a support structure 514. In certain examples, the mounting location 512 may couple to a suspension system of the vehicle and transfer loads from the suspension system and distribute them around the vehicle.

In this example, the support core 508 includes the support structure 514 having a energy transfer structure 516 with stiffening members 518 dispersed through the energy transfer structure 516. FIGS. 5A-5C also show the barrier portion 510 including stiffening features 520 disposed across a surface of the barrier portion 510. In this example, the stiffening features 520 include a channel configuration to provide stiffness in some directions and allow deformation in others. FIGS. 5A-5C also show support structure 514 and barrier portion 510 including orifice 532 and orifice 534 respectively allowing vehicle systems to interact through the barrier support system.

Figure 6:
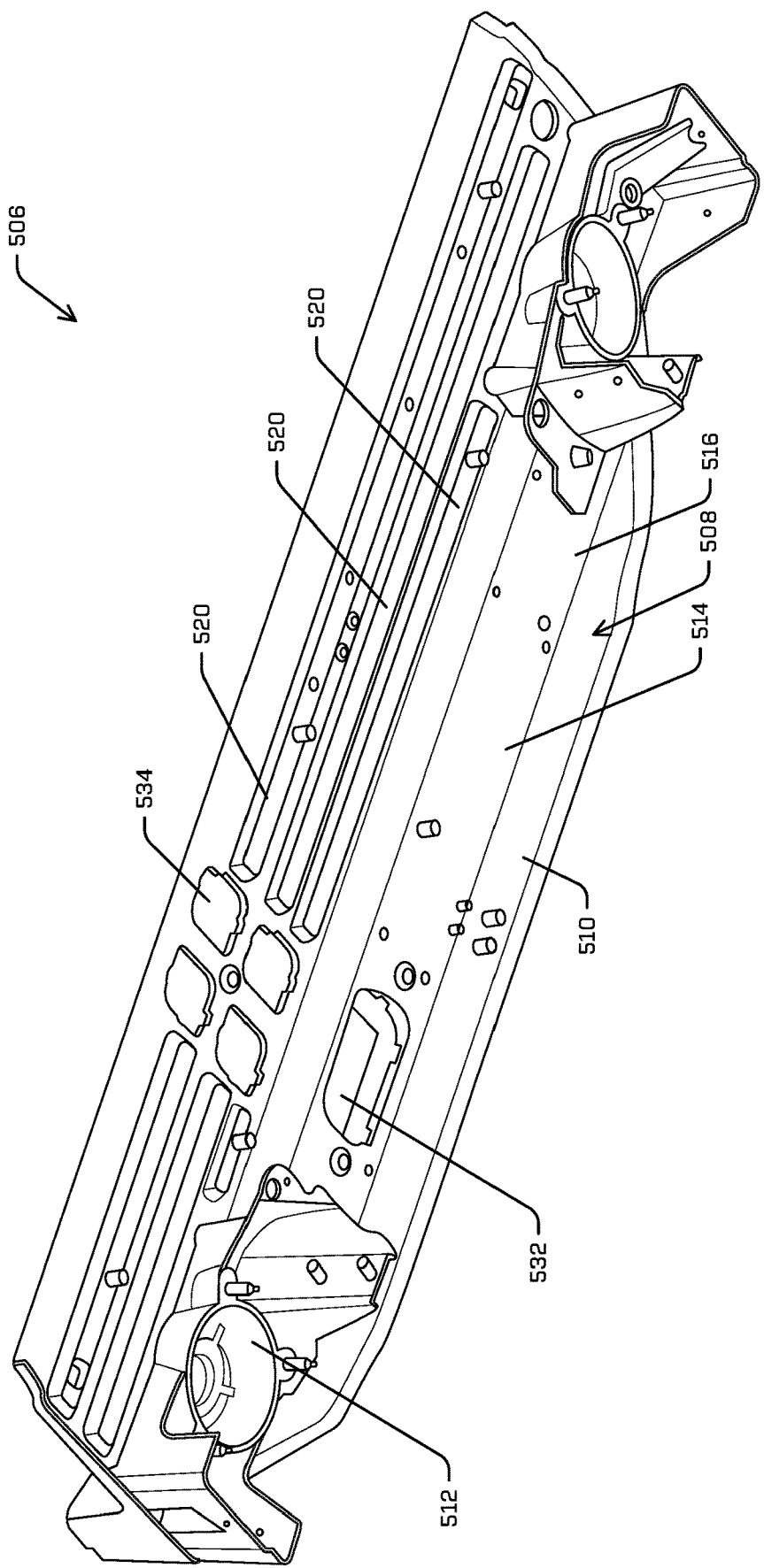

FIG. 6 shows a perspective view from below of the example barrier support system 506 shown in FIGS. 5A-5C. In this example, the barrier support system 506 includes a support core 508 and a barrier portion 510. Here, FIG. 6 shows another perspective of the support core 508 that includes a mounting location 512 and a support structure 514. In this example, the mounting location 512 may couple to a suspension system of the vehicle and transfer loads from the suspension system and distribute them around the vehicle. For example, the mounting location 512 may couple to a strut or other suspension component.

FIG. 6 also shows another perspective of the support structure 514 having a energy transfer structure 516. In this example, the channel wall portion of the energy transfer structure 516 is shown. FIG. 6 shows another perspective of the barrier portion 510 including stiffening features 520 disposed across a surface of the barrier portion 510. In this example, the stiffening features 520 include a channel configuration to provide stiffness in some directions and allow deformation in others. FIG. 6 also shows support structure 514 and barrier portion 510 including orifice 532 and orifice 534 respectively allowing vehicle systems to interact through the barrier support system.

FIGS. 7A-7C show illustrative energy absorption techniques. For example, FIGS. 7A-7C show a simplified schematic illustration of a process and technique to manage energy from an impact through a crash management system. For example, FIG. 7A shows a schematic view of impact system 700 receiving a force substantially parallel to direction 702. In this example, a surface of the system 700, prior to the force being received is at a first datum 704. The system 700 includes an example barrier support system 706 that includes a support core 708 and a barrier portion 710. In certain examples, the barrier support system 706 may be similar to barrier support systems, 106, 206, and/or 506 and may have similar configurations and features. Here, FIG. 7A shows top down perspective of the support core 708 that includes a support structure 714 having a energy transfer structure 716 with stiffening members 718 dispersed through the energy transfer structure 716. FIG. 7A also shows the barrier portion 710 including stiffening features 720 disposed across a surface of the barrier portion 710. In this example, the stiffening features 720 include a channel configuration to provide stiffness in some directions, for example orthogonal to direction 702 and allow deformation in others, for example, parallel to direction 702. FIG. 7A also shows the support structure 714 and barrier portion 710 including orifice 732 and orifice 734 respectively allowing vehicle systems to interact through the barrier support system.

FIG. 7A also shows a second datum 722 that illustrates a division between the barrier support system 706 and a cabin space 724 that may be configured to transport passengers. In certain examples, in response to an impact from a force substantially parallel to direction 702, it may be desirable for the barrier support system 706 to deform, move, and/or compact, without entering and/or impacting the cabin space 724 and/or any passengers. In certain examples, a region 726 of the barrier support system 706 may be configured to mover relative to cabin space 724 and or the second datum 722 in response to the impact force. In certain examples, the region 726 may be configured to substantially resist deformation in response to the impact force. In certain examples, the region 726 may include regions of the barrier support system 706 corresponding to the support core 708.

FIG. 7B shows an illustrative example of the barrier support system 706 receiving a force parallel to direction 702, for example, during a collision. In this example, the barrier support system 706 deforms in response to receiving the force. For example, a portion of the barrier system 706 that was located at the first datum 704 has moved towards second datum 722 and is located at third datum 728. In this example, the deformation of the barrier system 706 absorbed energy from the force and cause a deformation of the barrier system 706. Here, the support structure 714 moves towards the second datum 722 while the barrier portion 710 deforms towards the second datum 722. FIG. 7B shows energy transfer structure 716 and stiffening members 718 moving towards the second datum 722 causing a portion of the barrier portion 710 to deform. FIG. 7B also shows the stiffening features 720 deforming to compact portions of the barrier portion 710. In certain examples, a distance between stiffening features 720 and a sizing of the stiffening features 720 may cause the stiffening features to collapse and or fold onto or over an adjacent stiffening feature. For example, adjacent stiffening features 720 may cause a crumple zone to form in the barrier portion 710 when receiving a force substantially parallel to direction 702.

FIG. 7C shows another illustrative example of the barrier support system 706 receiving a force parallel to direction 702, for example, during a crash. In this example, FIG. 7C shows a state of the barrier support system in response to a force greater than the force received as discussed with respect to FIG. 7B or a state of the barrier support system as it continues to respond to the force as discussed with respect to FIG. 7B. In this example, the barrier support system 706 deforms in response to receiving the force. For example, a portion of the barrier system 706 that was located at the first datum 704 has moved towards second datum 722 and is located at fourth datum 730. In this example, the deformation of the barrier system 706 absorbed energy from the force and cause a deformation of the barrier system 706. Here, the support structure 714 moved towards the second datum 722 while the barrier portion 710 deformed towards the second datum 722. FIG. 7C shows energy transfer structure 716 and stiffening members 718 moving towards the second datum 722 causing a portion of the barrier portion 710 to deform. FIG. 7C also shows the stiffening features 720 deforming to compact portions of the barrier portion 710. In certain examples, a distance between stiffening features 720 and a sizing of the stiffening features 720 may cause the stiffening features to collapse and or fold onto or over an adjacent stiffening feature. For example, adjacent stiffening features 720 may cause a crumple zone to form in the barrier portion 710 when receiving a force substantially parallel to direction 702.

In certain examples, the relative deformation between the barrier portion 710 and the support core 708 when responding to a force substantially parallel to direction 702, may be controlled. For example, the number and configuration of stiffening features 720 may be adjusted to increase or decrease the overall and relative deformation of the barrier portion 710 when compared to the support core 708. Additionally or alternatively, the support structure 714 with the energy transfer structure 716 with stiffening members 718 dispersed through the energy transfer structure 716 may be adjusted to increase or decrease the overall and relative deformation of the support core 708 when compared to the barrier portion 710. In addition to avoiding the incursion of the barrier support system 706 into the cabin space 724 and/or any passengers, the barrier support system 706 may be tailored to address other vehicle considerations. For example, the support core 708 may be tailored to reduce vibration transmission within the vehicle, for example, vibrations transferred from the vehicle suspension into the cabin. By controlling the relative deformation between the barrier portion 710 and the support core 708, other design considerations may be given more weight or focus allowing the other component to be adjusted to compensate. For example, the support core 708 may be reinforced or enhanced to address a vibration and/or HVAC concern. This reinforcement or enhancement may affect the energy absorption and or deformation characteristics that may otherwise cause the barrier support system 706 to adversely impact the cabin. However, in certain examples, the barrier portion 710 may be configured to compensate for the changes in the support core 708. For example, a thickness or material selection of the barrier portion 710 may be adjusted. Additionally or alternatively, the number, configuration, and/or spacing of the stiffening features 720 may be adjusted.

Additional Example Barrier Support System Structures

FIGS. 8A-8D show a simplified schematic illustrations of example barrier support systems. For example, FIG. 8A shows barrier support system 806 that includes a support core 808 and a barrier portion 810. In certain examples, the barrier support system 806 may be similar to barrier support systems, 106, 206, 506, and/or 706 and may have similar configurations and features. Here, FIG. 8A shows top down perspective of the support core 808 that includes a support structure 814 having a energy transfer structure 816 with stiffening members 818 dispersed through the energy transfer structure 816. FIG. 8A also shows the barrier portion 810 including stiffening features 820 disposed across a surface of the barrier portion 810. In this example, the stiffening features 820 include a channel configuration to provide stiffness in some directions and allow deformation in others. FIG. 8A also shows the support structure 814 and barrier portion 810 including orifice 832 and orifice 834 respectively allowing vehicle systems to interact through the barrier support system.

FIG. 8B shows barrier support system 906 that includes a support core 908 and a barrier portion 910. In certain examples, the barrier support system 906 may be similar to barrier support systems, 106, 206, 506, 706, and/or 806 and may have similar configurations and features. Here, FIG. 8B shows top down perspective of the support core 908 that includes a support structure 914 having a energy transfer structure 916 with stiffening members 918 dispersed through the energy transfer structure 916. FIG. 8B also shows the barrier portion 910 including stiffening features 920 disposed across a surface of the barrier portion 910. In this example, the stiffening features 920 include a channel configuration to provide stiffness in some directions and allow deformation in others. FIG. 8B also shows the support structure 914 and barrier portion 910 including orifices 932 and orifices 934 respectively allowing vehicle systems to interact through the barrier support system. In this example, the barrier support system 906 has more orifices than the barrier support system 806 shown in FIG. 8A. In this example, the support core 908 and barrier portion 910 may be adjusted to provide sufficient support to the vehicle, while still absorbing and/or deforming sufficiently when receiving energy during an impact.

FIG. 8C shows barrier support system 1006 that includes a support core 1008 and a barrier portion 1010. In certain examples, the barrier support system 1006 may be similar to barrier support systems, 106, 206, 506, 706, 806, and/or 906 and may have similar configurations and features. Here, FIG. 8C shows top down perspective of the support core 1008 that includes a support structure 1014 having a energy transfer structure 1016 with stiffening members 1018 dispersed through the energy transfer structure 1016. FIG. 8C also shows the barrier portion 1010 including stiffening features 1020 disposed across a surface of the barrier portion 1010. In this example, the stiffening features 1020 include a channel configuration to provide stiffness in some directions and allow deformation in others. FIG. 8C also shows the support structure 1014 and barrier portion 1010 including orifices 1032 and orifices 1034 respectively allowing vehicle systems to interact through the barrier support system. FIG. 8C also shows orifices 1036 also disposed in the barrier portion 1010. In certain examples, the orifices 1036 may be disposed in portions of stiffening features 1020. In certain examples, additional vehicle systems may pass through orifices 1036, for example, additional HVAC capacities or cabling. In this example, the barrier support system 1006 has more orifices than the barrier support system 806 shown in FIG. 8A. In this example, the support core 1008 and barrier portion 1010 may be adjusted to provide sufficient support to the vehicle, while still absorbing and/or deforming sufficiently when receiving energy during an impact.

FIG. 8D shows barrier support system 1106 that includes a support core 1108 and a barrier portion 1110. In certain examples, the barrier support system 1106 may be similar to barrier support systems, 106, 206, 506, 706, 806, 906, and/or 1006 and may have similar configurations and features. Here, FIG. 8D shows top down perspective of the support core 1108 that includes a support structure 1114 having a energy transfer structure 1116. FIG. 8D also shows the barrier portion 1110 including stiffening features 1120 disposed across a surface of the barrier portion 1110. In this example, the stiffening features 1120 include a channel configuration to provide stiffness in some directions and allow deformation in others. FIG. 8D also shows the support structure 1114 and barrier portion 1110 including orifices 1132 and orifices 1134 respectively allowing vehicle systems to interact through the barrier support system. In this example, the support structure 1114 having a energy transfer structure 1116 does not have the stiffening members 818 of the barrier support system 806 shown in FIG. 8A. In this example, the support core 1108 and barrier portion 1110 may be adjusted to provide sufficient support to the vehicle, while still absorbing and/or deforming sufficiently when receiving energy during an impact. In certain examples, the energy transfer structure 1116 may have relatively thicker walls than the energy transfer structure 816 shown in FIG. 8A.

EXAMPLE CLAUSES

Any of the example clauses in this section may be used with any other of the example clauses and/or any of the other examples or embodiments described herein.

A: A vehicle comprising: a cabin assembly; a first suspension component; a second suspension component; and a support structure including: a first mounting location coupled to the first suspension component of the vehicle; a second mounting location coupled to the second suspension component of the vehicle; a third mounting location coupled to the cabin assembly; and a fourth mounting location coupled to the cabin assembly; wherein the support structure is configured to provide a stiff mounting interface between the cabin assembly, via the third and fourth mounting locations, and the first and second suspension components, via the first and second mounting locations, by transferring loads therebetween, the support structure defining a through-cavity configured to pass a vehicle component through the through-cavity; and wherein the support structure is configured to act as a planar environmental barrier to separate a first area of the cabin assembly from a second area of the vehicle outside of the first area.

B: The vehicle of paragraph A, the support structure further comprising an energy transfer structure extending between the first and second mounting locations.

C: The vehicle of paragraph A or B, the energy transfer structure comprising a channel with vertical webs spanning between a first wall and a second wall of the channel.

D: The vehicle of any one of paragraphs A-C, wherein the through-cavity passes through a third wall of the channel, the third wall substantially perpendicular to at least one of the first wall or the second wall.

E: The vehicle of any one of paragraphs A-D, further comprising a seat within the first area of the cabin assembly and the support structure is adjacent to the seat, wherein the support structure is configured to deform in response to a collision with the support structure to prevent energy transference to the seat.

F: The vehicle of any one of paragraphs A-E, the support structure configured to plastically deform, from a first configuration, in a first direction coplanar with the planar environmental barrier upon receiving an energetic input in the first direction, to a second configuration, wherein a first portion of the support structure is spaced a first distance from a second portion of the support structure in the first configuration, and the first portion of the support structure is spaced a second distance from the second portion of the support structure in the second configuration, the first distance being greater than the second distance.

G: The vehicle of any one of paragraphs A-F, wherein the support structure comprises a plurality of channels substantially orthogonal to a first direction coplanar with the planar environmental barrier, a first channel of the plurality of channels spaced from a second channel of the plurality of channels to cause a surface of the support structure between the first channel and second channel to overlap a lower portion of the first channel or second channel when in a deformed configuration.

H: A support barrier system comprising: a support structure portion including: a first mounting location configured to couple to a first suspension component of a vehicle; a second mounting location configured to couple to a second suspension component of the vehicle; and a third mounting location configured to couple to a body or frame of the vehicle; wherein the support structure portion is configured to provide a stiff mounting interface between the body or frame of the vehicle to the first and second suspension components by transferring loads therebetween, the support structure portion defining a through-cavity configured to pass a vehicle component through the through-cavity; and a barrier portion coupled to the support structure portion, wherein the barrier portion and the support structure portion are configured to act as an environmental barrier to separate a first area of the vehicle from a second area of a vehicle.

I: The support barrier system of paragraph H, wherein the barrier portion and the support structure portion define a planar environmental barrier between the first area and the second area.

J: The support barrier system of paragraphs H or I, wherein the through-cavity provides an environmental pass through the planar environmental barrier.

K: The support barrier system of any one of paragraphs H-J, wherein the through-cavity is disposed between the first mounting location and the second mounting location.

L: The support barrier system of any one of paragraphs H-K, wherein the barrier portion is configured to deform in a direction coplanar with the planar environmental barrier.

M: The support barrier system of any one of paragraphs H-L, the barrier portion configured to plastically deform, from a first configuration, in a direction coplanar with the planar environmental barrier upon receiving an energetic input in the first direction, to a second configuration, wherein a first portion of the barrier portion is spaced a first distance from a second portion of the barrier portion in the first configuration, and the first portion of the barrier portion is spaced a second distance from the second portion of the barrier portion in the second configuration, the first distance being greater than the second distance.

N: The support barrier system of any one of paragraphs H-M, the barrier portion comprising a first channel and a second channel substantially orthogonal to a direction coplanar with the planar environmental barrier, the first channel spaced from the second channel to cause a surface of the barrier portion between the first channel and second channel to overlap a lower portion of the first channel or second channel when in a deformed configuration.

O: A cabin assembly comprising: a passenger compartment; and a support barrier comprising: a first mounting location configured to couple to a suspension of a vehicle; a second mounting location configured to couple to the suspension; a support structure connecting the first mounting location and the second mounting location, the support structure configured to transfer a load between the suspension and a body or frame of the vehicle, the support structure defining a through-cavity configured to pass a vehicle component through the through-cavity; and wherein the support barrier is configured to separate a first area of the vehicle from a second area of a vehicle; wherein a first portion of the support barrier is configured to absorb energy in a first direction and transfer energy in a second direction, the first direction being noncollinear with the second direction.

P: The cabin assembly of paragraph O, wherein the vehicle component comprises a duct of a heating, ventilation, and air conditioning (HVAC) system.

Q: The cabin assembly of paragraphs O or P, the support structure further comprising an energy transfer portion extending between the first mounting location and the second mounting location, the energy transfer portion comprising a channel with vertical webs spanning between a first wall and a second wall of the channel.

R: The cabin assembly of any one of paragraphs O-Q, wherein the through-cavity passes through a third wall of the channel, the third wall substantially perpendicular to at least one of the first wall or the second wall.

S: The cabin assembly of any one of paragraphs O-R, the first portion configured to deform in the first direction upon receiving an energetic input in the first direction above an energy threshold to prevent the support barrier from entering the passenger compartment during an impact of the vehicle.

T: The cabin assembly of any one of paragraphs O-S, the first portion comprising a plurality of channels substantially orthogonal to the first direction, a first channel of the plurality of channels spaced from a second channel of the plurality of channels to cause surface of the barrier between the first channel and second channel to overlap a lower portion of the first channel or second channel when in a deformed configuration.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a cabin assembly;
   a first suspension component;
   a second suspension component; and
   a support structure including:
      a first mounting location coupled to the first suspension component of the vehicle;
      a second mounting location coupled to the second suspension component of the vehicle;
      a third mounting location coupled to the cabin assembly; and
      a fourth mounting location coupled to the cabin assembly;
   wherein the support structure is configured to provide a stiff mounting interface between the cabin assembly, via the third and fourth mounting locations, and the first and second suspension components, via the first and second mounting locations, by transferring loads therebetween, the support structure defining a through-cavity configured to pass a vehicle component through the through-cavity; and
   wherein the support structure is configured to act as a planar environmental barrier to separate a first area of the cabin assembly from a second area of the vehicle outside of the first area.

2. The vehicle of claim 1, the support structure further comprising an energy transfer structure extending between the first and second mounting locations.

3. The vehicle of claim 2, the energy transfer structure comprising a channel with vertical webs spanning between a first wall and a second wall of the channel.

4. The vehicle of claim 3, wherein the through-cavity passes through a third wall of the channel, the third wall substantially perpendicular to at least one of the first wall or the second wall.

5. The vehicle of claim 1, further comprising a seat within the first area of the cabin assembly and the support structure is adjacent to the seat, wherein the support structure is configured to deform in response to a collision with the support structure to prevent energy transference to the seat.

6. The vehicle of claim 1, the support structure configured to plastically deform, from a first configuration, in a first direction coplanar with the planar environmental barrier upon receiving an energetic input in the first direction, to a second configuration, wherein a first portion of the support structure is spaced a first distance from a second portion of the support structure in the first configuration, and the first portion of the support structure is spaced a second distance from the second portion of the support structure in the second configuration, the first distance being greater than the second distance.

7. The vehicle of claim 1, wherein the support structure comprises a plurality of channels substantially orthogonal to a first direction coplanar with the planar environmental barrier, a first channel of the plurality of channels spaced from a second channel of the plurality of channels to cause a surface of the support structure between the first channel and second channel to overlap a lower portion of the first channel or second channel when in a deformed configuration.

8. A support barrier system comprising:
a support structure portion including:
a first mounting location configured to couple to a first suspension component of a vehicle;
a second mounting location configured to couple to a second suspension component of the vehicle; and
a third mounting location configured to couple to a body or frame of the vehicle;
wherein the support structure portion is configured to provide a stiff mounting interface between the body or frame of the vehicle to the first and second suspension components by transferring loads therebetween, the support structure portion defining a through-cavity configured to pass a vehicle component through the through-cavity; and
a barrier portion coupled to the support structure portion, wherein the barrier portion and the support structure portion are configured to act as an environmental barrier to separate a first area of the vehicle from a second area of a vehicle.

9. The support barrier system of claim 8, wherein the barrier portion and the support structure portion define a planar environmental barrier between the first area and the second area.

10. The support barrier system of claim 9, wherein the through-cavity provides an environmental pass through the planar environmental barrier.

11. The support barrier system of claim 10, wherein the through-cavity is disposed between the first mounting location and the second mounting location.

12. The support barrier system of claim 9, wherein the barrier portion is configured to deform in a direction coplanar with the planar environmental barrier.

13. The support barrier system of claim 9, the barrier portion configured to plastically deform, from a first configuration, in a direction coplanar with the planar environmental barrier upon receiving an energetic input in the first direction, to a second configuration, wherein a first portion of the barrier portion is spaced a first distance from a second portion of the barrier portion in the first configuration, and the first portion of the barrier portion is spaced a second distance from the second portion of the barrier portion in the second configuration, the first distance being greater than the second distance.

14. The support barrier system of claim 9, the barrier portion comprising a first channel and a second channel substantially orthogonal to a direction coplanar with the planar environmental barrier, the first channel spaced from the second channel to cause a surface of the barrier portion between the first channel and second channel to overlap a lower portion of the first channel or second channel when in a deformed configuration.

15. A cabin assembly comprising:
a passenger compartment; and
a support barrier comprising:
a first mounting location configured to couple to a suspension of a vehicle;
a second mounting location configured to couple to the suspension;
a support structure connecting the first mounting location and the second mounting location, the support structure configured to transfer a load between the suspension and a body or frame of the vehicle, the support structure defining a through-cavity configured to pass a vehicle component through the through-cavity; and
wherein the support barrier is configured to separate a first area of the vehicle from a second area of a vehicle;
wherein a first portion of the support barrier is configured to absorb energy in a first direction and transfer energy in a second direction, the first direction being noncollinear with the second direction.

16. The cabin assembly of claim 15, wherein the vehicle component comprises a duct of a heating, ventilation, and air conditioning (HVAC) system.

17. The cabin assembly of claim 15, the support structure further comprising an energy transfer portion extending between the first mounting location and the second mounting location, the energy transfer portion comprising a channel with vertical webs spanning between a first wall and a second wall of the channel.

18. The cabin assembly of claim 17, wherein the through-cavity passes through a third wall of the channel, the third wall substantially perpendicular to at least one of the first wall or the second wall.

19. The cabin assembly of claim 15, the first portion configured to deform in the first direction upon receiving an energetic input in the first direction above an energy threshold to prevent the support barrier from entering the passenger compartment during an impact of the vehicle.

20. The cabin assembly of claim 15, the first portion comprising a plurality of channels substantially orthogonal to the first direction, a first channel of the plurality of channels spaced from a second channel of the plurality of channels to cause surface of the barrier between the first channel and second channel to overlap a lower portion of the first channel or second channel when in a deformed configuration.

* * * * *